Patented Oct. 30, 1923.

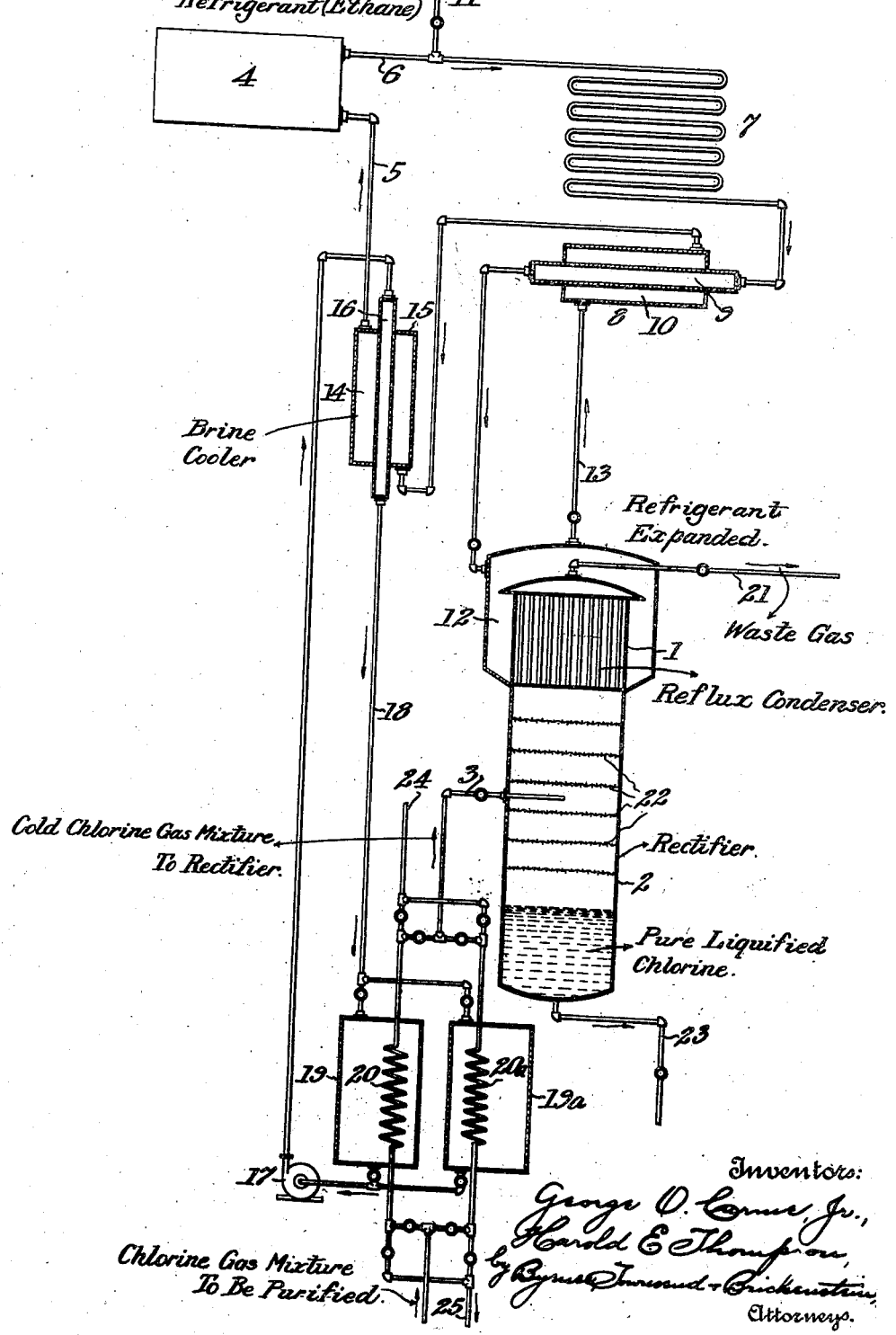

1,472,294

UNITED STATES PATENT OFFICE.

GEORGE O. CURME, JR., AND HAROLD E. THOMPSON, OF CLENDENIN, WEST VIRGINIA, ASSIGNORS TO CARBIDE & CARBON CHEMICALS CORP., A CORPORATION OF NEW YORK.

PROCESS OF PURIFYING CHLORINE AND OTHER CORROSIVE GASES.

Application filed September 26, 1921. Serial No. 503,219.

*To all whom it may concern:*

Be it known that we, GEORGE O. CURME, Jr., and HAROLD E. THOMPSON, citizens of the United States, residing at Clendenin, in the county of Kanawha and State of West Virginia, have invented certain new and useful Improvements in the Process of Purifying Chlorine and Other Corrosive Gases, of which the following is a specification.

This invention relates to the liquefaction of constituents of gas mixtures of the kind which cannot be handled in ordinary compressors because of their destructive action on the metals and lubricants used in the construction and operation of such compressors. As examples of such mixtures, impure chlorine, burner gases containing sulfur dioxid with more or less sulfuric acid, and the reaction mixture obtained in the chlorination of methane may be mentioned, the constituents to be liquefied from the mixtures cited being respectively chlorine, sulfur dioxide and chlorides of carbon. The invention will be described in connection with the preparation of liquid chlorine from chlorine-containing gas mixtures, but it will be understood that the principles involved are applicable to the liquefaction of many other gases from corrosive mixtures containing them.

The critical temperature and pressure of chlorine indicate that it is a comparatively easily liquefiable gas. While liquid chlorine has long been an article of commerce, its liquefaction is attended with considerable technical difficulty because of its great chemical activity. The difficulty is greatly increased if gaseous impurities are associated with the gas.

The chlorine gas of commerce, even when electrolytically produced, is usually not of great purity, and it may carry as much as 15% of impurities, chiefly air and hydrogen. By the application of Dalton's law, it can be shown that when a gas mixture containing chlorine and one or more other gases is refrigerated, the gases admixed with the chlorine being unliquefied under the existing conditions and being substantially insoluble in liquid chlorine, the percentage of the chlorine present which will escape liquefaction will be $$\frac{100\,ap}{(100-a)(P-p)}$$

where $a$ is the percentage of impurities contained in the mixture, $P$ the absolute pressure to which the mixture is subjected, and $p$ is the vapor pressure of chlorine at the existing temperature. That is to say, the percentage of the chlorine which will liquefy is $$(1)\quad 100\left(1-\frac{ap}{(100-a)(P-p)}\right)$$

It will be apparent that this value may be increased either by increasing the pressure on the mixture or by cooling the mixture (decreasing $p$). If a purity of 85% is assumed for the impure chlorine, and the vapor pressure curve of chlorine is referred to, it will be seen that in order to secure a substantially complete liquefaction of the chlorine, either a high pressure or a very low temperature is necessary.

Both refrigeration and pressure are now used in conjunction to liquefy chlorine from the impure gas, but with the degree of cooling employed, the pressure required to liquefy even a moderate proportion of the chlorine is quite high. Since ordinary compressors cannot be used, much difficulty is encountered in securing a pressure which will result in an acceptable degree of liquefaction. Various types of complicated compressors are employed, such as those in which the chlorine is displaced by sulfuric acid, the acid being in turn displaced by a plunger or by air. Compressors in which the impure chlorine is entrained in a column of sulfuric acid falling from a great height are also used. All such apparatus is cumbersome and costly to operate, the difficulties of operation increasing rapidly as the pressure at which the chlorine is delivered increases.

With the pressures industrially attainable, liquefaction is far from complete, and the chlorine which escapes liquefaction is generally utilized by making it into bleaching powder, in which form chlorine is less valuable than when uncombined. Furthermore, the pressures which are employed promote the contamination of the liquid chlorine by causing gaseous impurities to dissolve in it.

A principal object of the present invention is to obviate the above-mentioned disadvantages, by using low pressures for liquefaction and reducing the temperatures to obtain the desired liquefying effect. Our invention also provides for the prevention of the contamination of the liquid by the dissolving therein of the associated gases, which contamination would normally be brought about by the use of relatively low temperatures. Our invention further contemplates the provision of methods for handling the cold liquid produced without subjecting it to high pressures before or at the time of its introduction into the vessels designed to receive it.

Referring again to formula (1), it will be seen that if an 85% chlorine mixture is treated at 10 lbs. gage pressure (1277 mm. absolute) the vapor pressure of chlorine cannot exceed 460 mm. in the final refrigerated zone if 90% of the chloride is to be liquefied. This corresponds to a temperature of $-44°$ C. Under similar conditions, with a temperature of $-75°$ C. at the coldest point, nearly 99% of the chlorine can be liquefied. Such low temperatures cannot be obtained with the common refrigerants, such as carbon dioxide, ammonia and sulfur dioxide, but can be readily produced by other refrigerants, for example, ethane. The boiling temperatures of ethane are tabulated below, the corresponding pressures being given:

| Pressure in lbs. per sq. in. gage. | Temperature deg. C. |
|---|---|
| 5 | $-84.7$ |
| 10 | $-80.3$ |
| 15 | $-76.7$ |
| 20 | $-73.6$ |
| 25 | $-70.7$ |
| 30 | $-68.3$ |

It will be apparent that a temperature of $-75°$ C., at which substantially 99% of the chlorine in an 85% mixture can be liquefied, is easily obtainable by the use of such a low-boiling refrigerant.

Our invention contemplates the liquefaction of chlorine from gas-mixtures with such temperatures in the coldest zone that only pressures of the order of two atmospheres, absolute, are necessary to condense 95% or more of the chlorine present, when chlorine mixtures of such purity as has been mentioned are treated. The invention includes the application of similar temperatures to the liquefaction of chlorine from mixtures of lower purity whereby a corresponding advantage is obtained, though in the latter case the percentage of the chlorine liquefied will be less. Our invention also includes the liquefaction from corrosive mixtures of gases other than chlorine which require final cooling to temperatures of the order of those referred to if an acceptable recovery is to be obtained without exceeding very moderate pressures, such as can be obtained with simple and efficient apparatus in spite of the corrosive nature of the mixtures treated. Such temperatures as are contemplated are below those obtainable with carbon dioxide, and will permit the industrial liquefaction of chlorine from mixtures which are too dilute to be treated by the present processes, but the chief application of our process will probably be to chlorine mixtures of comparatively high purity, and the yield of chlorine as liquid being increased as desired up to substantially 100%.

Our invention consists primarily in liquefying the major portion of the chlorine, or other gas, at a temperature not far removed from the true boiling point of pure chlorine, and at such a temperature that solubility of the gases is at a minimum; then progressively lowering the temperature of the remaining gas mixture still containing chlorine, thus liquefying more and more of the chlorine content; and finally passing the chlorine mixture through a zone of such temperature that a negligible amount of gaseous chlorine leaves the system with the thus separated gaseous impurities. The process is so carried out that the liquid chlorine formed at the coldest zone passes counter-current to and in contact with the gas passing to the coldest zone, which results in the liquid chlorine being progressively warmed up to a temperature corresponding to its true boiling point at the prevailing pressure, and being simultaneously subjected to rectification to remove the last traces of dissolved gaseous impurities. In this way the advantages of low pressure and high (relatively) temperature condensation are combined with the quantitative yields of extreme low temperature condensation.

An embodiment of our invention will now be described in connection with the attached diagrammatic drawing, ethane being referred to by way of example as the refrigerant used, and chlorine as the constituent to be liquefied.

The impure chlorine enters the apparatus through the coil 20, where it is cooled to a temperature of approximately $-25°$ C. In this coil some liquefaction may take place and from here the combined liquid and gas pass through pipe 3 to the rectifying column in which the pressure may be from 10 to 15 lbs. gage. The chlorine already liquefied falls back through the column 2 over the lower rectifying screens 22, while the gaseous chlorine and its gaseous impurities rise through other of the upper rectifying screens 22 where they are met by super-cooled liquid chlorine falling back from the reflux condenser 1. This super-cooled liquid condenses more of the chlorine from the gaseous mixture until it is itself raised in temperature to its boiling point under the pressure conditions prevailing. Thus there is here accomplished a further liquefaction of chlorine at a temperature well above the minimum temperature prevailing in the condenser 1, and simultaneously a warming of the condensed chlorine to a temperature where its solvent power for the dissolved gases is much reduced.

The gaseous mixture still containing uncondensed chlorine proceeds to the reflux condenser 1, which is maintained at a temperature of about $-75°$ C. as described below. Here the last of the remaining condensible chlorine is removed and the gaseous impurities with the small amount of chlorine still remaining pass out and are discharged at 21. The liquid chlorine from the condenser 1 falls back as described above, over the screens 22 of the rectifying column 2, and as above described, is warmed up and loses its dissolved gaseous impurities. The descending liquid is augmented by that amount condensed from the ascending gas stream and by that amount entering conduit 3 already liquefied in coil 20. The total liquid descending past the point of entry of conduit 3 falls over the remaining rectifying screens of the column where it is further rectified by the ascending vapors arising from the liquid chlorine which collects in the bottom of the column 2, and where the liquid is finally all collected. This collected liquid is substantially pure chlorine and exists at the temperature corresponding to the boiling point of pure liquid chlorine at the pressure prevailing in the rectifying column. As desired, it may now be withdrawn at 23 into the receptacles intended to receive it. These receptacles which are conveniently steel cylinders, are preferably cooled to a temperature of $-25°$ C. before the liquid chlorine is run into them. As this temperature is below the boiling point at the pressure prevailing within the column, no evaporation of liquid chlorine will result. The valves on the cylinders of liquid chlorine are then closed and the cylinders are ready for shipment. As the temperature of the cylinder and its contents rises to that of the atmosphere, the pressure within the cylinder will, of course, increase, but will remain well within the limits which are permissible in the storage and shipment of the liquefied gases. The cooling bath 19 may be conveniently of such size and so located that the cylinders may be placed in it for cooling and kept in it during filling.

The low temperature of condenser 1 is maintained by liquid ethane which is produced in the following manner: The ethane is taken by the compressor 4 from conduit 5 and is discharged into line 6 at a pressure of, for example, 800 lbs. per square inch. The high pressure ethane then passes to cooler 7 where its temperature is brought down to about that of the atmosphere. During this stage of the operation some of the ethane may be liquefied. The cooled ethane then passes to heat exchanger 8 where it is subjected to the temperature of low pressure ethane, evaporated at condenser 1, the high pressure ethane passing thru passage 9 and the cold low pressure ethane passing countercurrent through the jacket 10. Any ethane not liquefied in the cooler 7 is liquefied in the heat exchanger 8 and cooled below its condensation temperature.

The refrigerant is then expanded at 12 into the space around the condenser 1, the pressure in this compartment being preferably maintained at about 15 lbs. gage pressure. The liquid ethane boils at this pressure due to the heat abstracted by it from the gases entering the tubes of the condenser, and the gaseous ethane so produced escapes at 13 to the jacket 10 of the heat exchanger 8. From jacket 10 the gaseous low pressure ethane passes to the jacket 14 of the heat exchanger 15 where it cools a brine adapted to remain liquid at and below $-25°$ C. The gaseous ethane is then discharged through pipe 5 to the suction side of compressor 4, completing its cycle. A branch 11 in the ethane cycle permits the system to be filled or drained, and leakage to be replaced. The brine referred to is circulated through the passage 16 of the heat exchanger 15 by the pump 17. After being cooled in heat exchanger 15, the brine flows through pipe 18 to the cooler 19 in which is immersed the chlorine cooling coil 20, and is then returned to heat-exchanger 15.

It will be noted that in the process as described, refrigeration is applied to the chlorine at two points, viz coil 20 and condenser 1, it being understood that a large portion of the condensation is effected by the super-cooled liquid falling down from the condenser and meeting the ascending gases. This arrangement is subject to modification in various ways as by changing the degree of refrigeration at coil 20, or omitting refrigeration at this point, or by inserting one or more other less intense sources of refrigeration in the column, below the final condenser.

As the chlorine entering the apparatus contains some water and other impurities, which will be liquefied or solidified in coil 20, the bath 19 and the coil 20 are duplicated at 19ª and 20ª so that one chlorine cooler is always available should it be necessary to take one out of operation for the purpose of removing any impurities collected therein. The piping is so arranged that a gas such as air may be introduced at 24 and passed through the coil 20 or the coil 20ª to thaw any frozen impurities therein, the brine surrounding the coil to be thawed having been previously transferred to the other bath. The product which is thawed out of the coil is blown out at 25 and disposed of in any suitable manner.

The apparatus described forms no part of the present invention, and many modifications thereof will suggest themselves.

Having described our invention, what we claim is:

1. Process of liquefying a corrosive constituent from a gas mixture containing also gases which are much more volatile than said corrosive constituent which comprises compressing the mixture to a pressure not substantially in excess of two atmospheres, cooling the compressed mixture in a low temperature zone sufficiently to liquefy a high percentage of the corrosive constituent, and returning the liquid so produced in rectifying contact with relatively warm gas passing to said low temperature zone to expel dissolved gases from the liquid.

2. Process according to claim 1 in which the low temperature zone is cooled by the evaporation of liquid ethane.

3. Process according to claim 1 in which the mixture treated comprises chlorine and air.

In testimony whereof, we affix our signatures.

GEORGE O. CURME, Jr.
HAROLD E. THOMPSON.